A. M. WILLIAMS.
AUTOMATIC WEIGHING SCALE.
APPLICATION FILED APR. 13, 1914.
1,126,164.
Patented Jan. 26, 1915.
3 SHEETS—SHEET 3.
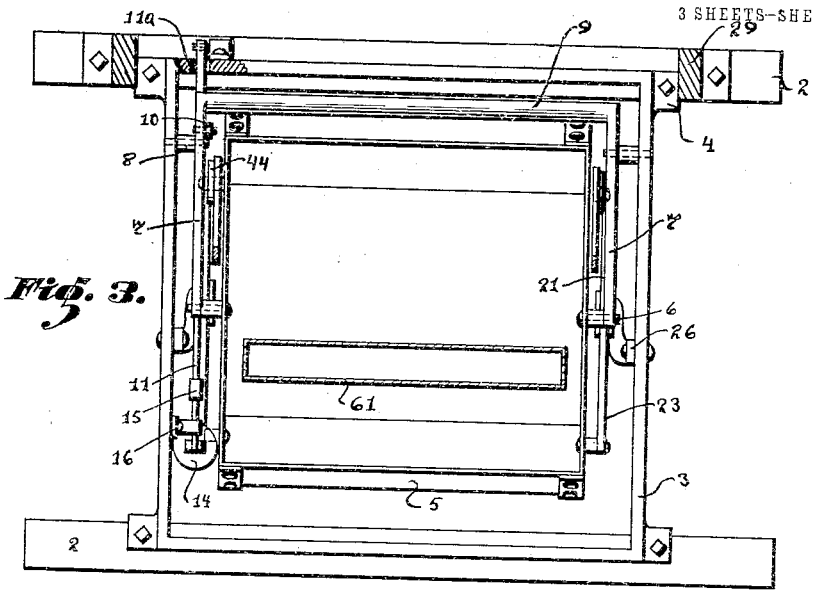
Fig. 3.
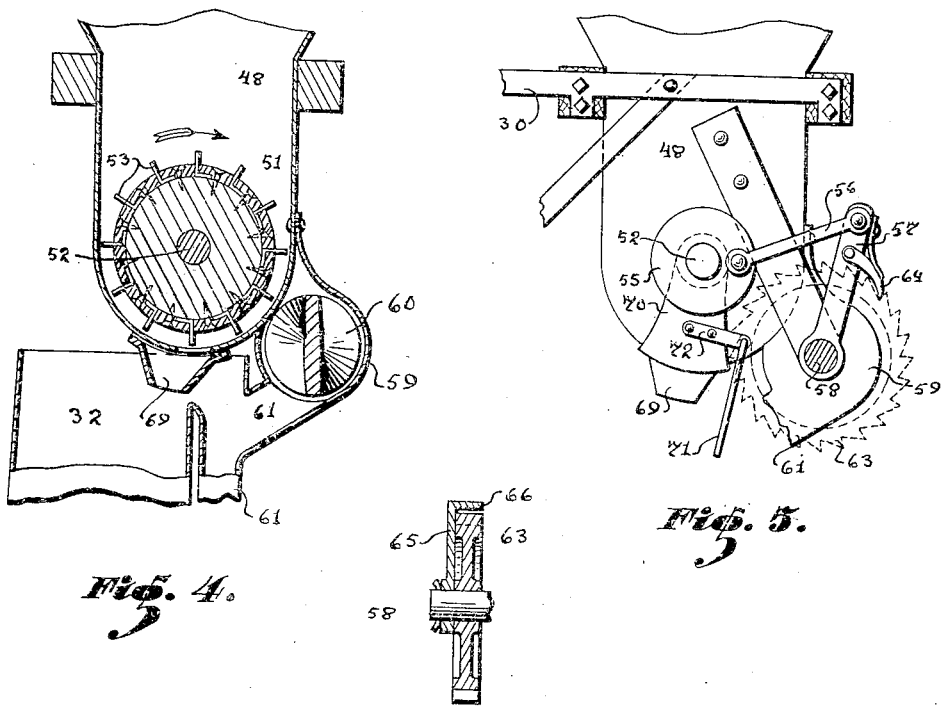
Fig. 4.
Fig. 6.
Fig. 5.
WITNESSES:
C. A. Ellis
R. E. Bruckner
INVENTOR
A. M. Williams
BY
John M. Spellman
ATTORNEYS

UNITED STATES PATENT OFFICE.

ANDREW M. WILLIAMS, OF DALLAS, TEXAS.

AUTOMATIC WEIGHING-SCALE.

1,126,164.

Specification of Letters Patent.

Patented Jan. 26, 1915.

Application filed April 13, 1914. Serial No. 831,430.

*To all whom it may concern:*

Be it known that I, ANDREW M. WILLIAMS, a citizen of the United States, residing at Dallas, in the county of Dallas and State of Texas, have invented certain new and useful Improvements in Automatic Weighing-Scales, of which the following is a specification.

My invention relates to new and useful improvements in that class of automatic weighing scales, which continuously receive a supply of bulk material such as grain, cotton seed, etc., and discharge the same in quantities having a predetermined weight.

My improvement may further be classified as being adapted to that class of automatic scales which employ a main receiver into which material is normally fed, and an auxiliary receiver into which the material is fed while the main receiver is discharging.

It is the object of my invention to provide a continuous weighing automatic scale that will operate with greater accuracy than such scales as have been hitherto provided for a similar purpose, and which will furthermore employ a novel and positive mechanism for automatically controlling the doors of the main and auxiliary receivers.

A still further object of the invention is to provide a device of the character described that will be strong, durable, efficient and simple and comparatively inexpensive to produce, also one in which the several parts will not be likely to get out of working order.

Figure 1:
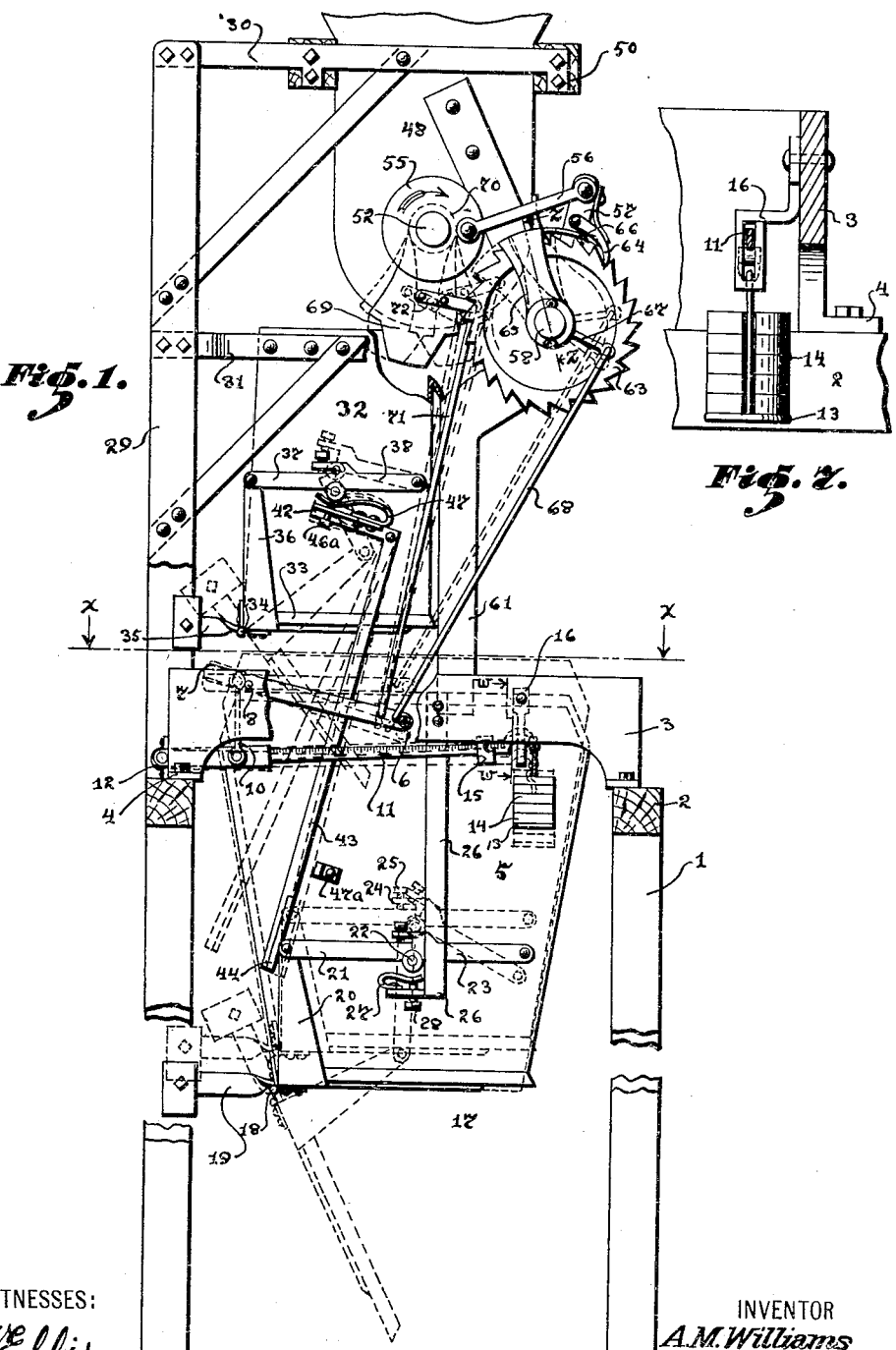
Figure 2:
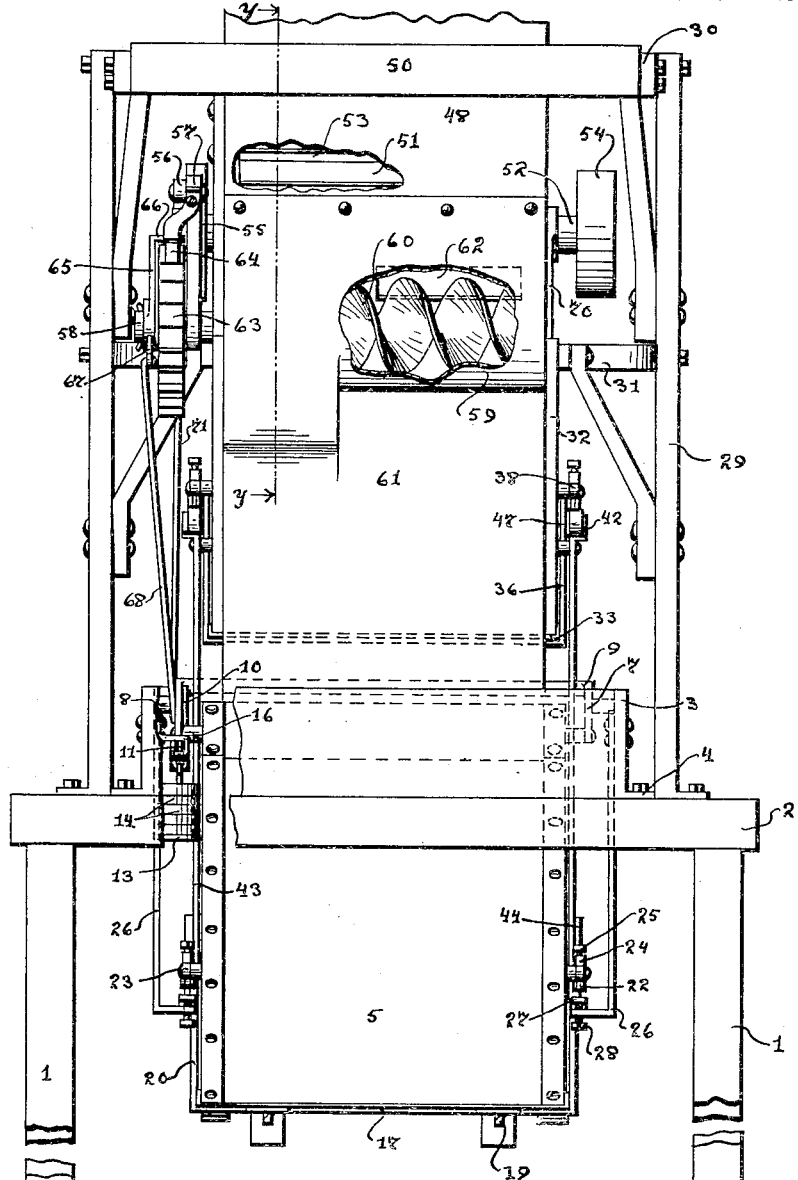

With the above and other objects in view, the invention has relation to certain novel features of construction and operation, an example of which is described in the following specification and illustrated in the accompanying drawings, wherein:

Figure 1 is a view of my weighing scales in side elevation, the positions of the various parts when the main receiver is being filled being indicated in full lines, and the positions of the parts when the said receiver is discharging being indicated in dash lines. Fig. 2 is a view of the same in front elevation. Fig. 3 is a horizontal sectional view, the section being taken upon the line $x$—$x$ of Fig. 1. Fig. 4 is a fragmentary vertical sectional view showing the upper portion of the device, the section being taken upon the line $y$—$y$ of Fig. 2. Fig. 5 is a view duplicating certain parts illustrated in Fig. 1, with the exception that a certain ratchet wheel correlated with said parts is shown in dash lines in this figure, so as to permit certain parts behind said ratchet wheel to be seen. Fig. 6 is a detail sectional view, the section being taken upon the line $z$—$z$ of Fig. 1. Fig. 7 is a detail vertical sectional view, the section being taken upon the line $w$—$w$ of Fig. 1.

Referring now more particularly to the drawings, wherein like reference characters designate similar parts in all the figures, the numeral 1 denotes the four legs of the lower or supporting frame of my scale, the front legs of said frame being rigidly connected at their upper extremities by a horizontal beam 2, and a similar beam being extended between the upper ends of the rear legs. The members 2 support the front and back edges of a rectangular metallic frame 3, said frame being formed with feet 4, which are bolted or otherwise secured to the members 2. The parts 1, 2 and 3 in conjunction constitute the lower or supporting frame of my scale. Within said frame, there is mounted the main receiver 5, which terminates at its lower end some distance above the corresponding extremities of the legs 1, and has its upper end disposed within the metallic frame 3. Adjacent to the top of said receiver, a pair of knife edge pivot pins 6 project rigidly from opposite points upon the receiver side walls, the location of said pivots being such that the receiver will be balanced when supported by the same. The pivot pins 6 respectively enter suitable apertures provided in the forward extremities of two parallel bars 7, one of which is disposed at each side of the receiver. The bars 7 are respectively pivotally supported by the parallel side members of the frame 3 as indicated at 8, the pivots 8 being considerably closer to the rear ends of the bars 7 than to the front ends of said bars. A rigid connection is established between the rear extremities of the bars 7 by an elongated weight bar 9, adjacent to the top of the receiver at the rear of the same. Slightly to the rear of the pivot 8 of one of the bars 7, a vertical swinging link 10 has connection with said bar 7 and extends downwardly therefrom, the lower end of the link 10 being connected with the rear portion of a normally horizontal scale beam 11. The beam 11 is passed at its rear end through a slot $11^a$ in the rear member of the frame 3 and is pivotally mounted upon a bracket 12 exteriorly secured to the frame 3. From the forward end of the scale beam 11 there is swung a weight pan 13 carrying a variable number of standard weights 14. The beam 11 is graduated in the usual manner and carries the usual sliding pea 15, which may be registered with any of the graduating marks of the beam. Adjacent to its forward end the beam 11 is passed through a keeper bracket 16, restricting the beam against any lateral motion and limiting its angular vertical motion. By properly adjusting the sliding pea 15 and the magnitude of the weight 14, the receiver may be so counterbalanced that it will undergo a downward displacement only when there has accumulated in said receiver a predetermined weight of material indicated upon the scale beam at the point to which the pea 15 is adjusted.

The bottom of the receiver 5 is formed by a hinged door 17 mounted upon a pintle 18 extended along the rear edge of the door aperture. A weighted arm 19 is rigidly secured to the door and projects rearwardly from the same, serving to automatically return the door to its normal closed position after the contents of the receiver have been discharged.

At each side of the receiver, there is rigidly secured to the rear end of the door an arm 20 which in the closed position of the door projects upwardly. The free end of each arm 20 has pivotal connection with one extremity of a swinging link 21, the other extremity of which has pivotal connection as indicated at 22 with one end of a second swinging link 23, pivoted at its other end upon the adjacent side wall of the receiver near the front edge of said wall. When the door 17 is in its closed position, the links 21 and 23 at each side of the receiver are in a horizontal alinement by which the door is locked in the position specified. The connected extremities of said links are contiguous above the pivot point 22. Owing to this fact, and also to the provision of a finger 24 upon the link 23 which finger overhangs the link 21 and receives a screw 25 bearing upon said link 21, the alinement of the two links 21 and 23 may not be broken through a downward displacement of their joined extremities. Since the pivot point 22 is disposed at a slightly lower level than the pivot connecting with the other extremities of said links, there is normally no chance for the alinement of the links to be broken by an upward displacement of their jointed extremities.

In order that the door 17 may be automatically opened when the contents of the receiver have reached the predetermined amount, a vertical bar 26 is rigidly secured at its upper end to the frame 3, and its lower extremity is bent at a right angle to support a spring 27 beneath the juncture of the links 21 and 23, and to further support an adjusting screw 28, through which a horizontal portion of said spring may be varied slightly to or from the joined ends of the two links. When the material in the main receiver has accumulated to such an extent as to displace said receiver downwardly, the joined ends of the links 21 and 23 will come into contact with the spring 27 just above the screw 28, the links consequently being displaced upwardly out of alinement. Owing to the heavy thrust acting forwardly in said links (due to the weight of the material in the receiver), the angle of divergence between the links will at once increase, permitting the door to swing to the open position indicated in dash lines in Fig. 1, the resulting positions of the arm 20 and the two swinging links being also shown in dash lines in the same figure.

Upon the lower or supporting frame, there is superimposed an upper frame comprising a pair of uprights 29 respectively disposed at the rear corners of my scale, and each carrying two forwardly projecting arms 30 and 31, the arms 30 having connection with the upper ends of the uprights, while the arms 31 are intermediately secured to the uprights. Between the arms 31, there is rigidly secured the upper extremity of an auxiliary receiver 32 considerably smaller in size than the main receiver. The auxiliary receiver is spaced slightly above the main receiver, and is provided with a door 33 forming its bottom, and hinged at its rear edge upon a pintle 34. A weighted arm 35 counterbalances the door 33, returning said door to its closed position after the auxiliary receiver has discharged its contents. With the door 33, there is correlated a locking mechanism similar to that already described as being associated with the door 17. This mechanism comprises a pair of arms 36 projecting rigidly from the rear portion of the door at each side of the receiver, and a pair of swinging links 37 and 38 having pivotally connected adjacent ends and having their other extremities respectively pivotally connected to the correlated arm 36 and the forward portion of the adjacent side wall of the receiver. Upon said side wall, there is pivoted a bell-crank comprising a short arm 42 projecting rearwardly and terminating beneath the joined ends of the links 37 and 38, and a long arm 43 projecting downwardly at a slight rearward inclination, and provided upon its lower end with a laterally projecting lug 44, which normally bears against the upper end of the adjacent arm 20. The short arm of the bell-crank carries a leaf spring 47, which normally lies just beneath the pivoted ends of the links 37 and 38, and a screw 46ª mounted in said arm 42 bears upwardly against said spring constituting a support for its free end.

When the door of the main receiver has been opened due to a downward displacement of said receiver, the correlated parts 20, 21 and 23 will assume the positions indicated in dash lines in Fig. 1, and consequently the bell-crank comprising the arms 42 and 43 will be permitted to undergo a slight angular displacement such as will shift the long arm 43 slightly forward into contact with a stop bracket 47ª mounted fast upon the adjacent side wall of the main receiver. As the door of the main receiver returns to its closed position due to the counterbalancing effect of the weighted arm 19, the upper end of the arm 20 coming sharply into contact with the lug 44 will subject the bell-crank comprising the arms 42 and 43 to a slight clock-wise rotation, whereby the shorter arm 42 will be shifted upwardly through a sufficient distance to break the alinement of the links 37 and 38. Immediately thereupon the weight of the material resting upon the door of the auxiliary receiver will swing said door open, simultaneously shifting the correlated parts 36, 37 and 38 to the positions indicated in dash lines in Fig. 1.

Between the upper pair of arms 30, there is rigidly mounted a chute 48, which chute is furthermore engaged between a pair of horizontal beams 50 rigidly connecting the arms 30, and respectively contiguous with the front and back walls of the chute. The bottom of the chute 48 is of semi-cylindrical form, and is spaced a short distance above the front edge of the auxiliary receiver. The bottom of the chute 48 is formed with a discharge orifice elongated between the side walls of the chute, said orifice being formed in the middle or lowermost portion of the bottom of the chute, and being disposed directly above the front wall of the auxiliary receiver, as is most clearly illustrated in Fig. 4.

In the bottom portion of said chute, a rotary agitator 51 is mounted fast upon a shaft 52 disposed at the center line of curvature of the bottom of the chute and journaled in the side walls of the same. A plurality of ribs 53 projecting rigidly from the peripheral face of the agitator, and extending from end to end of the same serve to positively impart to the material contiguous to the agitator the rotary movement of the same. Upon one end of the shaft 51, exterior to the chute 48, a drive pulley 54 is mounted fast. Upon the other extremity of said shaft, there is mounted fast a crank wheel 55, also exterior to the chute, and from said crank wheel, a pitman 56 extends forwardly and is pivotally connected with the upper end of an arm 57 mounted fast upon a shaft 58 parallel to the shaft 51. The shaft 58 passes centrally through a substantially cylindrical casing 59, the end walls of which form bearings for said shaft. Within said casing, there is mounted upon the shaft 58 an ordinary spiral conveyer 60, which when subjected to rotation will convey such material as may have entered the casing 59 to one extremity thereof from which extremity an auxiliary chute 61 is extended downwardly just in front of the auxiliary receiver, projecting at its lower end slightly into the main receiver. A limited amount of the material in the main chute 48 is adapted to enter the casing 59 through a rectangular orifice 62 formed in the partition between said chute and casing (see Fig. 2). Upon the shaft 58 adjacent to the arm 57, there is mounted fast a sprocket wheel 63 the teeth of which are engaged by a spring-pressed pawl 64 mounted upon the upper end portion of said arm. The crank wheel 55, pitman 56, arm 57, and pawl 64, engaging the ratchet wheel 63 constitute a mechanism for normally communicating to the conveyer 60 a step-by-step rotation by which a small amount of material, known in the art as a "dribble" is normally fed into the auxiliary chute 61.

A mechanism for periodically interrupting the communication of step-by-step rotation to the said conveyer will now be described. Adjacent to the ratchet wheel 63, is loosely mounted upon the shaft 58 an arm 65, projecting upwardly at a rearward inclination, and carrying upon its free end an arcuate guard plate 66 covering a portion of the toothed face of the ratchet wheel. Normally this plate will be disposed slightly to the rear of the pawl 64, offering no impediment to the engagement of said pawl with the ratchet wheel. From the pivoted extremity of the arm 65, a pin 67 projects rigidly in a forward and downward direction, and an elongated swinging link 68 establishes connection between the outer end of the pin 67 and the front end of the bar 7 which is at the same side of the scales as said pin. The downward movement which the receiver undergoes when its load has reached a predetermined weight serves to communicate through the rod 68 a slight angular displacement to the guard plate 66 such that said guard plate will interpose itself between the pawl 64 and the ratchet wheel 63 just before the main receiver reaches its lowermost position, thereby discontinuing rotation of the conveyer 60 during the time that the main receiver is discharging.

With the discharge aperture of the chute 48, there is correlated an adjustable spout 69, which extends from end to end of the chute 48 beneath the same, and is swung from the shaft 52 by a pair of arms 70 disposed respectively adjacent to the end walls of the chute 48 and having a rigid connection with said spout. The spout 69 is adapted to be adjusted between two limiting positions, in one of which said spout conducts the material escaping from the chute 48 into the auxiliary receiver 32, as illustrated in full lines in Fig. 1, while in the other limiting position, said chute will discharge the material into the auxiliary chute 61, as indicated in dash lines in Fig. 1. The latter position is the one which said spout will ordinarily occupy, the other position being assumed only for comparatively short intervals of time. Adjacent to the point of juncture of the rod 68 with one of the bars 7, there is pivotally connected to the same bar, an elongated swinging link 71, which is extended upwardly and has pivotal connection at its upper end with a bracket 72 mounted fast upon one of the arms 70. The vertical displacement of the receiver acts through the rod 71 to control the movement of the spout 69 between its two limiting positions.

A complete explanation will now be given as to the operation of my improved weighing scales. From a suitable bin, (not shown) a continuous stream of bulk material is permitted to escape into the chute 48, the rate of flow of the material being proportioned so that the material will be discharged from said chute as rapidly as it enters the same. The constantly revolving agitator 53 will overcome any tendency of the material to become packed in the bottom of the chute 48, forcing the material to discharge from the chute through the aperture 62 and spout 69. When the machinery is started, the receiver 5 being empty will be maintained in its uppermost position by the counterbalancing weights 14 and 15, and since the bars 7 will also be in their uppermost positions, the spout 69 will occupy the positions indicated in dash lines in Fig. 1, conducting material from the chute 48 into the auxiliary chute 61. Hence the main receiver 5 will gradually be filled with the material entering said receiver from the auxiliary chute. Since when the bars 7 are in their uppermost or horizontal positions, the guard plate 66 does not interfere with the step-by-step actuation of the ratchet wheel 63, the spiral conveyer 60 will revolve and while the main receiver is filling, will maintain a small flow or "dribble" of material into the auxiliary chute from the conveyer casing 59.

It is apparent that a step-by-step rotation of the conveyer will be maintained as long as the pawl 64 is permitted to engage the teeth of the sprocket wheel, since the arm 57 carrying the pawl is subjected to constant oscillation by its connection with the crank wheel 55.

When there has accumulated in the main receiver a certain predetermined weight of material, the counterbalancing effect of the weights 14 and 15 will be overcome, and the receiver and the arms 7 will shift to their lowermost positions. While the main receiver and the bars 7 are shifting from their uppermost limiting positions to the positions illustrated in full lines in the drawings, the adjustable spout 69 will be shifted from the position illustrated in dash lines in Fig. 1 to that illustrated in full lines in the same figure. In other words, while the receiver and bars 7 are undergoing the specified displacement, the flow of material into the auxiliary chute 61 will be cut off, and will be transferred to the auxiliary receiver 32. Since the main flow of material into the main receiver has been cut off by the time said receiver reaches the position illustrated in full lines in the drawings, the completion of the downward movement of said receiver must be actuated by the weight of material flowing into the receiver as a "dribble," this flow being maintained by the step-by-step rotation of the conveyer 60. It is imperative therefore that the conveyer be permitted to continue its operation after the receiver has passed through the first portion of its downward motion. Such angular movement therefore as the guard plate 66 will undergo while the receiver is descending from its uppermost limiting position to that shown in full lines in the drawings will not bring said guard plate to a position such as will impede the engagement of the ratchet wheel 63 by the pawl 64. As the "dribble" flow carries the receiver through the final stage of its downward displacement, the guard plate 66 will in passing through the final stage of its forward angular displacement raise the pawl 64 out of contact with the ratchet wheel 63, and thus cut off the "dribble" flow (by stopping the spiral conveyer) just before the door of the main receiver is thrown open through the unlocking of the linkage correlated with said door by the parts 27 and 28. When the door of the main receiver is open, and the parts 20, 21 and 23 have assumed the position shown in dash lines in the Fig. 1, the elongated bell-crank arm 43 is prevented from swinging forward to a vertical position by the stop bracket 47ª. The weight of material resting upon the door of the main receiver, will throw said door immediately wide open when the correlated locking mechanism is released, and the contents of the receiver will therefore discharge immediately and completely, the operation of discharging being performed with sufficient speed to be completed before the receiver can fully undergo its return to its normal uppermost position.

During the brief time interval necessary for the receiver to complete its downward motion and to discharge its contents, the auxiliary receiver will be taking the flow of material through the spout 69 from the chute 48. As the door of the main receiver resumes its closed position, the upper end of one of the arms 20 will strike sharply against the lower end of the bell-crank member 43, and will thus subject the bell-crank to an angular displacement such that the short arm 42 of said bell-crank will unlock the linkage holding the door of the auxiliary receiver closed. The material in the auxiliary receiver will therefore immediately force said door open and the said receiver will discharge its contents into the main receiver. The door of the auxiliary receiver will then be closed by the correlated weighted arm and in closing will be automatically locked by the correlated linkage. The return upward motion of the receiver will first subject the guard plate 66 to a rearward displacement permitting the pawl 64 to engage the ratchet wheel 63, and will subsequently shift the adjustable spout 69 so as to divert the flow of material from the auxiliary receiver 32 to the auxiliary chute 61. It is to be observed that the bell-crank comprising the arms 42 and 43 does not normally occupy a position such as will interfere with the locking effect of the linkage correlated with the door of the auxiliary receiver. The displacement of said bell-crank whereby it acts to unlock the said linkage is only momentary, and the bell-crank returns due to its own weight to the position illustrated in the drawings in which the auxiliary receiver door linkage is permitted to remain locked. Each time that the main receiver has accumulated the desired and predetermined amount of material the above described series of automatic operations will be repeated, so that at substantially constant time intervals there will be discharged from my scales certain known quantities of the material being weighed.

The invention is presented as including all such changes and modifications as properly come within the scope of the following claims.

What I claim is:

1. In a device of the character described, a counterbalanced main receiver, displaceable downwardly to a limited extent, and provided with a door at its bottom, of a mechanism normally locking the receiver door in its closed position, means automatically tripping said mechanism as the receiver reaches its lowermost position, a fixed auxiliary receiver located above the displaceable receiver and provided with a door at its bottom adapted to discharge into the main receiver, a mechanism normally locking said last-mentioned door in its closed position, a chute normally discharging bulk material into the main receiver, mechanism cutting off the main flow of material into the main receiver as the latter moves down, diverting said flow into the auxiliary receiver during the discharge of the main receiver and renewing the flow into the main receiver as the latter moves up, and means tripping the locking mechanism of the auxiliary receiver door during the upward motion of the main receiver.

2. In a device of the character described, a counterbalanced main receiver, displaceable downwardly to a limited extent, and provided with a door at its bottom, of a mechanism normally locking the receiver door in its closed position, means automatically tripping said mechanism as the receiver reaches its lowermost position, a fixed auxiliary receiver located above the displaceable receiver and provided with a door at its bottom adapted to discharge into the main receiver, a mechanism normally locking said last mentioned door in its closed position, a chute normally discharging bulk material into the main receiver, mechanism actuated by said receiver cutting off the main flow of material into the receiver as the latter moves down, diverting said flow into the auxiliary receiver during the discharge of the main receiver and renewing the flow into the primary receiver as the latter moves up, and means actuated by the main receiver during its upward motion tripping the locking mechanism of the auxiliary receiver door during the upward motion of the main receiver.

3. In a device of the character described, the combination with a counterbalanced receiver, displaceable vertically to a limited extent, and provided with a door at its bottom, of a mechanism normally locking the receiver door in its closed position, means automatically tripping said mechanism as the receiver reaches its lowermost position, a chute normally discharging bulk material into the receiver, a mechanism actuated by the receiver, cutting off the main flow of material into the receiver as the latter moves down and renewing the flow as the receiver moves up, a casing communicating with said chute and receiving material from the same, a conveyer mounted in said casing, discharging a small flow of material into the receiver when in operation, a pawl and ratchet mechanism through which a step-by-step rotation is communicated to the conveyer, and a mechanism actuated by the receiver disengaging the pawl and ratchet wheel during the final stage of downward motion of the receiver, subsequent to the cutting off of the main flow, and renewing the engagement of the pawl with the ratchet wheel during the primary stage of upward motion of the receiver.

4. In a device of the character described, the combination with a main counterbalanced receiver, displaceable vertically to a limited extent, and provided with a door at its bottom, of a mechanism normally locking the receiver door in its closed position, means automatically tripping said mechanism as the receiver reaches its lowermost position, a chute normally discharging all bulk material into said receiver, a fixed auxiliary receiver, provided with a door at its bottom adapted to discharge the contents of the auxiliary receiver into the main receiver, a periodically acting mechanism diverting the main discharge of material from the main receiver to the auxiliary receiver during downward displacement of the main receiver, and producing the reverse effect during upward displacement of the main receiver, a mechanism normally maintaining a small flow of material into the main receiver through the main supply chute additional to the main flow, and a mechanism cutting off or renewing the small flow of material according as the receiver is completing the final stage of its downward motion or undergoing the primary stage of its upward motion.

5. In a device of the character described, the combination with a counterbalanced main receiver, displaceable vertically to a limited extent, and provided with a door at its bottom, of a mechanism normally locking the receiver door in its closed position, means automatically tripping said mechanism as the receiver reaches its lowermost position, a chute normally discharging bulk material into the main receiver, an auxiliary receiver provided at its bottom with a door adapted to discharge the contents of said receiver into the main receiver, an adjustable spout mounted beneath said chute, and deflecting material from the chute into the main receiver or auxiliary receiver according as it is in one or the other of its limiting positions, a mechanism actuated by the receiver shifting said adjustable spout to discharge into the auxiliary receiver as the main receiver moves down, and assisting the spout to discharge into the main receiver as the latter moves up, means normally locking the door of the auxiliary receiver and means actuated by the main receiver during its upward motion tripping the locking mechanism of the auxiliary receiver door.

6. In a device of the character described, the combination with a counterbalanced main receiver, displaceable vertically to a limited extent, and provided at its bottom with a door, of a mechanism normally locking said door in its closed position, means automatically tripping said mechanism as the receiver reaches its lowermost position, a chute normally discharging bulk material into the main receiver, an auxiliary receiver mounted above the main receiver and provided with a door at its bottom adapted to discharge the contents of said receiver into the main receiver, a mechanism actuated by the main receiver diverting the main flow of material from said receiver into the auxiliary receiver as the main receiver moves downwardly and diverting the flow of material back to the main receiver as the latter moves upwardly, a casing mounted adjacent to said chute, normally receiving a slight flow of material from the chute, a rotary conveyer mounted in said casing, a mechanism normally subjecting the conveyer to a step-by-step rotation, and a mechanism automatically stopping the conveyer as the main receiver approaches its lowermost position, and starting said conveyer as said receiver commences its upward motion.

In testimony whereof I have signed my name to this specification in the presence of two subscribing witnesses.

ANDREW M. WILLIAMS.

Witnesses:
R. E. C. BRUCKNER,
C. A. ELLIS.

Copies of this patent may be obtained for five cents each, by addressing the "Commissioner of Patents, Washington, D. C."